June 11, 1929.  J. E. POINTON  1,716,460
BREAD MAKING PLANT AND MACHINERY
Filed Nov. 11, 1926  2 Sheets-Sheet 1

J. E. Pointon
inventor
By: Marks & Clerk
Attys.

June 11, 1929.  J. E. POINTON  1,716,460

BREAD MAKING PLANT AND MACHINERY

Filed Nov. 11, 1926  2 Sheets-Sheet 2

J. E. Pointon, inventor

By: Marks & Clerk, Attys.

Patented June 11, 1929.

1,716,460

UNITED STATES PATENT OFFICE.

JOHN EDWARD POINTON, OF PETERBOROUGH, ENGLAND, ASSIGNOR TO BAKER PERKINS COMPANY INCORPORATED, OF NEW YORK, N. Y.

BREAD-MAKING PLANT AND MACHINERY.

Application filed November 11, 1926, Serial No. 147,803, and in Great Britain April 8, 1926.

This invention relates to bread making plant and machinery of the type wherein a continuous oven and a prover are arranged for operation in series, the loaves or bread portions being carried in a circuitous course through said prover and oven on an endless chain conveyor.

The object of the invention is to provide in such apparatus for the more ready, convenient and effective production of both tin and oven bottom bread as may be desired by the baker.

The invention comprises the combination with the oven and the prover for operating in series therewith, of means enabling the said prover to be employed for the proving of the dough portions for the production of both tin and oven bottom bread.

The invention further comprises the arrangement and combination of parts as hereinafter described and claimed.

Referring to the two accompanying sheets of explanatory drawings:—

The same reference letters in the different views indicate the same or similar parts.

Figure 1:
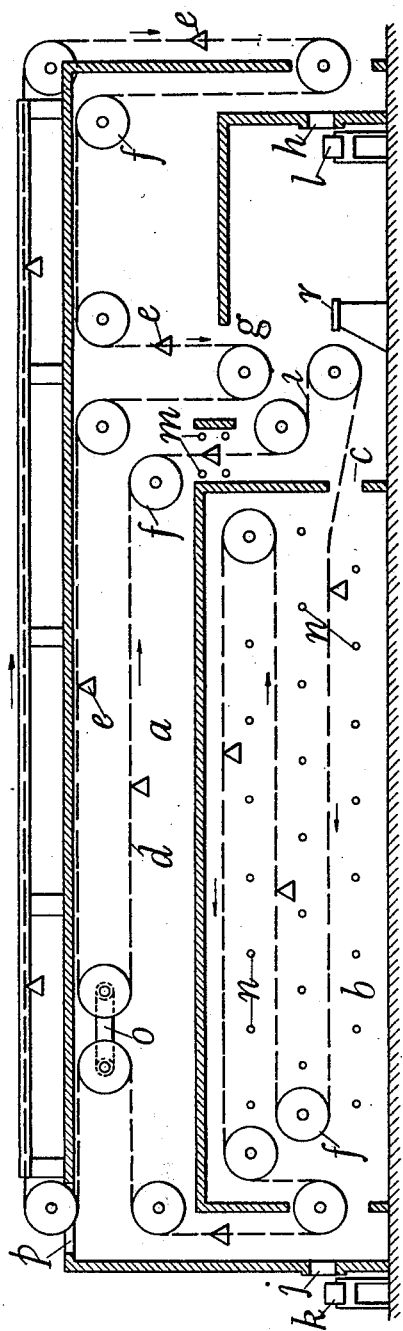
Figure 1 is a sectional elevation and Figure 2 a plan illustrating in outline or diagrammatic form a continuous oven and prover and showing one manner of applying this invention thereto.
Figure 2:
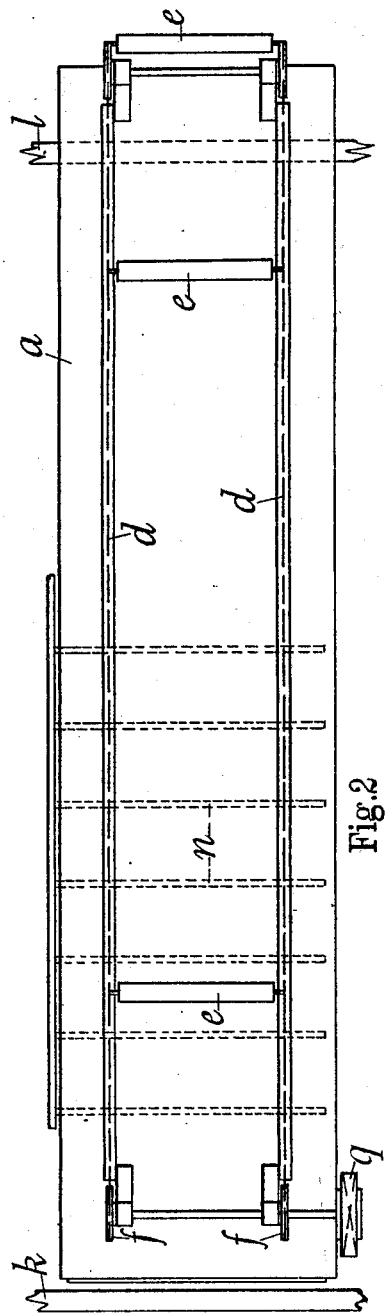

In the application of the invention illustrated at Figures 1 and 2, the prover comprises a chamber $a$ extending over the oven or baking chamber $b$ and also in advance of the entering end $c$ of said oven. The endless conveyor $d$ which has the usual trays or shelves such as $e$ suspended therefrom, serves both the proving and the baking chambers and by means of suitably disposed guide wheels as $f$ is caused to travel in a circuitous course through both chambers as indicated by the arrows. In the course of each complete circuit the conveyor in passing round the guide wheel at $g$ leaves and re-enters the prover at a position (hereinafter termed the intermediate exit) between the position at $h$, where the dough portions are placed on the prover trays or shelves $e$, and the position $i$ just prior to the entry to the oven. The said intermediate exit at $g$ and the path or course of the conveyor adjacent the same are arranged so that the dough portions may be readily removed from the conveyor on its emergence at such exit $g$ and replaced on that portion of it at $i$ which is about to enter the oven $b$. The length or extent of the circuit of the conveyor in its passage through the prover from the aforesaid position $h$ where the dough portions are inserted to the intermediate exit at $g$, is sufficient to give the necessary period proof to what is known as oven bottom bread, so called because the loaves or dough portions are placed directly upon the sole or baking surface which in this apparatus is afforded by the conveyor trays $e$. Hence, in the production of oven bottom bread the dough portions are removed from the conveyor at the intermediate exit $g$ and replaced on that portion of the conveyor at $i$ which is about to enter the oven. In such production of oven bottom bread, the conveyor or conveyor trays are empty when travelling through the prover from the re-entry immediately following the intermediate exit at $g$ to the exit at $i$ just prior to entering the oven.

For the production of tin bread, so called because each loaf or dough portion is placed in a tin or container in which it remains during proof and baking, a longer period of proof is required for the dough portions which are therefore not removed at the aforesaid intermediate exit $g$ but remain on the conveyor trays from the position of first entry to the prover at $h$ and until they have passed through the oven and arrived at the outlet $j$ where the loaves are withdrawn from the shelves $e$ and carried away by the belt conveyor $k$, or otherwise. The belt conveyor $l$ near the opposite end of the oven is for carrying the dough portions from the moulding machines to the aforesaid position $h$ where they are placed on the shelves $e$ of the conveyor $d$.

When producing oven bottom bread it is necessary to pre-heat the conveyor trays $e$ before placing the proved dough portions thereon, just prior to the oven entry, as contact with a cold tray would impair both the shape and condition of the baked loaves. For such preheating, elements $m$, such as steam tubes, gas burners or electric radiators or heating elements, are so placed as to raise the temperature of the trays to the required extent before the proved dough portions are placed thereon at the position $i$.

In its course through the oven the conveyor passes between steam, gas, or electric heating elements as *n* arranged to give the desired baking effect.

The period of proof of the dough portions, particularly when producing tin bread, may be varied by the employment of an adjustable guide pulley carriage *o* or the like within the prover for the conveyor *d* in its passage therethrough, whereby the length or extent of the course of the dough portions through the prover (from positions *g* to *i*) may be adjusted to give the desired variation.

From the position at *p* where *d* passes out from the oven *b*, the conveyor *d* returns over the top of the prover *a* as shown to the prover entry position at *h*. The conveyor has a continuance or intermittent movement imparted thereto from any convenient source of power acting through transmitting mechanism which may include a spur wheel as *q* mounted, as shown at Figure 2, upon one of the shafts carrying a pair of the guide wheels *f* for the chains forming the conveyor *d*. To permit of the bashing or shaping of the loaf portions between their removal at the intermediate exit at *g* and their subsequent replacement on the conveyor at *i* just in advance of the oven entry, a bashing table or support is provided at *r* (Figure 1).

Figure 3:
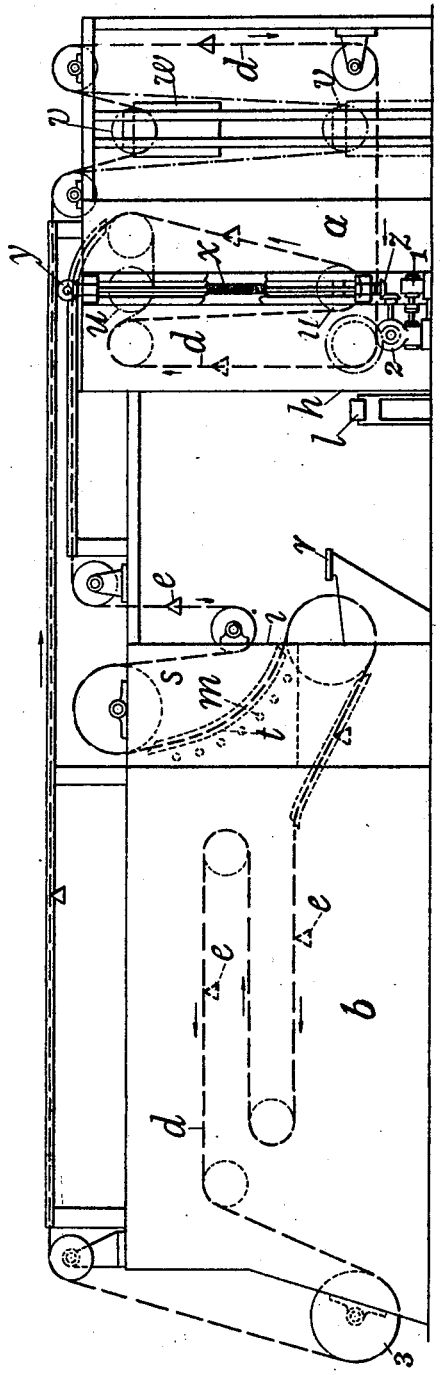
Figure 3 is an elevation and Figure 4 a plan showing another manner of applying the invention.
Figure 4:
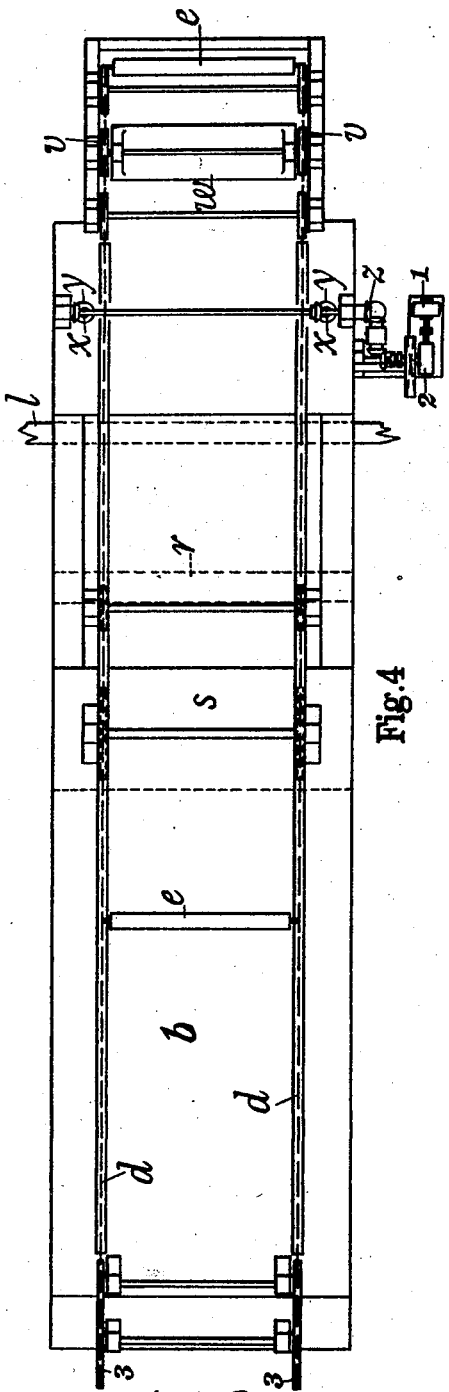

In the example of the application of the invention illustrated at Figures 3 and 4, the prover *a* is in advance of the oven *b* and does not extend over the latter as in the example at Figures 1 and 2. In travelling from the prover to the oven the conveyor *d*, prior to entering the oven at *i*, passes through the intermediate chamber *s* provided with heating elements *m* which, as with the like elements *m* in the apparatus illustrated at Figures 1 and 2, pre-heat the conveyor trays *e* for the baking of oven bottom bread. The conveyor is guided in its passage through the said intermediate chamber *s* by guide wheels as shown and by a fixed curved track as *t*.

The period of proof, or fermentation of the dough portions both for oven bottom bread or loaves and tin bread or loaves, may be varied by the provision in the prover *a* of an adjustable guide wheel as *u* for each of the chains forming the conveyor *d*, and corresponding guide wheels as *v* associated with the balance weight *w* on the exterior of the prover. The wheels *u* can be raised and lowered between the top and bottom positions shown at Figure 3 by any suitable mechanism, comprising for example a pair of screws, (of which one, *x*, is seen through the broken away portion of the prover wall in Figure 3), operated through bevel gears *y* and *z* from the electric motor 1 and gear box 2 from which also the conveyor *d* is operated. The bottom position of the wheels *u* gives the longest course for the conveyor *d* through the prover *b* and consequently the longest period of proof or fermentation for the dough portions. In like manner the top position of the wheels *u* gives the shortest course and the shortest period of proof. The raising and lowering of the wheels *u* is accompanied by a corresponding and automatic lowering and raising of the wheels *v* and balance weight *w* and thus the conveyor accommodates itself to such adjustments of the periods of proof.

The dough portions are placed on the conveyor trays at the position *h*, as with the former example. The baked loaves are removed as the conveyor passes out from the oven around the guide wheel 3. The conveyor returns over the top of the oven and prover as shown.

Having thus described my invention what I claim as new and desire to secure by Letters Patent is:—

1. In bread making plant and machinery, the combination comprising an oven, a prover, a conveyor serving said oven and prover, and guiding means for the said conveyor causing the latter in travelling through its circuit to bring the dough portions into a position on the exterior of the prover adjacent the oven entry and subsequently carry them through a looped or circuitous course from such position to the said entry.

2. In bread making plant and machinery, the combination comprising an oven, a prover, a conveyor, guiding means causing the said conveyor to travel in a circuitous course through said oven and said prover, heating elements in the oven extending across the spaces between the paths of the conveyor, guiding means causing the conveyor in traveling through its circuit to bring the dough portions into a position on the exterior of the prover adjacent the oven entry and subsequently carry them through a looped or circuitous course from such position to the said entry, and in association with said conveyor means for varying the period of proof.

In testimony whereof I have signed my name to this specification.

JOHN EDWARD POINTON.